(12) United States Patent
Kuniyoshi et al.

(10) Patent No.: US 7,802,450 B2
(45) Date of Patent: *Sep. 28, 2010

(54) ORGANIC-INORGANIC HYBRID GLASSY MATERIALS AND THEIR PRODUCTION PROCESSES

(75) Inventors: Minoru Kuniyoshi, Matsusaka (JP); Naoya Hayakawa, Matsusaka (JP); Kensuke Makita, Matsusaka (JP); Toshinobu Yoko, Uji (JP); Masahide Takahashi, Uji (JP)

(73) Assignee: Central Glass Company, Limited, Ube-shi (JP)

( * ) Notice: Subject to any disclaimer, the term of this patent is extended or adjusted under 35 U.S.C. 154(b) by 180 days.

This patent is subject to a terminal disclaimer.

(21) Appl. No.: 10/800,010

(22) Filed: Mar. 15, 2004

(65) Prior Publication Data

US 2005/0027083 A1 Feb. 3, 2005

(30) Foreign Application Priority Data

| Mar. 14, 2003 | (JP) | ............................. 2003-069327 |
| Mar. 14, 2003 | (JP) | ............................. 2003-069336 |
| Mar. 14, 2003 | (JP) | ............................. 2003-069342 |
| Mar. 14, 2003 | (JP) | ............................. 2003-069344 |
| Mar. 14, 2003 | (JP) | ............................. 2003-069351 |

(51) Int. Cl.
*C03B 8/00* (2006.01)
(52) U.S. Cl. ............................. 65/17.2; 65/395; 65/440
(58) Field of Classification Search ................... 65/395, 65/440, 17.6, 32.5, 17.2
See application file for complete search history.

(56) References Cited

U.S. PATENT DOCUMENTS

| 3,791,808 | A | | 2/1974 | Thomas |
| 5,608,123 | A | * | 3/1997 | Inoue et al. .................. 568/899 |
| 6,360,564 | B1 | * | 3/2002 | Cornelius et al. .............. 65/395 |
| 7,006,745 | B2 | * | 2/2006 | Etienne ...................... 385/129 |
| 2002/0160153 | A1 | * | 10/2002 | Minami et al. ............... 428/156 |
| 2003/0005723 | A1 | * | 1/2003 | Kawabe et al. ............... 65/17.2 |
| 2003/0124467 | A1 | * | 7/2003 | Minami et al. ............... 430/321 |

FOREIGN PATENT DOCUMENTS

| CN | 1338479 A | 3/2002 |
| JP | 59-97550 | 6/1984 |
| JP | 62-223323 | 10/1987 |
| JP | 62-297236 | 12/1987 |
| JP | 1-183438 | 7/1989 |

(Continued)

OTHER PUBLICATIONS

P.A. Tick, "Water Durable Glasses with Ultra Low Melting Temperatures", Physics and Chemistry of Glasses, Dec. 1984, pp. 149-154, vol. 25, No. 6.

(Continued)

*Primary Examiner*—Queenie Dehghan
(74) *Attorney, Agent, or Firm*—Crowell & Moring LLP (57) ABSTRACT

In a production process of an organic-inorganic hybrid glassy material, the invention relates to a process for producing an organic-inorganic hybrid glassy material, characterized in that the process comprises at least the three steps of producing a gel body by a sol-gel method; melting by heating; and aging, and it relates to an organic-inorganic hybrid glassy material produced by this process.

12 Claims, 2 Drawing Sheets

FOREIGN PATENT DOCUMENTS

| | | |
|---|---|---|
| JP | 2-137737 | 5/1990 |
| JP | 7-126035 | 5/1995 |
| JP | 2002-512293 | 4/2002 |
| JP | 2003-95690 | 4/2003 |
| JP | 2003-313048 | 11/2003 |
| JP | 2003-313300 | 11/2003 |
| JP | 2004-43242 | 2/2004 |

OTHER PUBLICATIONS

Kanichi Kamiya et al., "Preparation of Refractory Oxide Fibers from Metal Alcoholates—Possibility of Fiber Drawing in the Course of Hydrolysis of the Alcoholates," 1976, pp. 1547-1551, 84, 12.

Masahide Takahashi et al., "Synthesis of Organic-Inorganic Hybrid Glasses Through Non-Aqueous Acid-Base Reaction," New Glass, 2002, pp. 8-13, vol. 17, No. 2.

Haruki Niida et al., "Preparation and Structure of Organic-Inorganic Hybrid Precursors for New Type Low-Melting Glasses," Journal of Non-Crystalline Solids, 2002, pp. 292-299, 306, Elsevier Science B.V.

Annual Meeting of the Ceramic Society of Japan, 2001, Mar. 21, 2001, pp. 193, ISBN 4-931298-31-1.

Chinese Office Action dated Mar. 2, 2007 including English Translation (Twelve (12) pages).

* cited by examiner

ORGANIC-INORGANIC HYBRID GLASSY MATERIALS AND THEIR PRODUCTION PROCESSES

BACKGROUND OF THE INVENTION

The present invention relates to an organic-inorganic hybrid glassy material obtained from materials used in a sol-gel method as starting materials, and a production process of the same.

Polymer materials and low melting point glasses have been well known in the art as a material that is softened at 600° C. or lower and have been used in such various fields as sealing material, passivation glass and glaze. The polymer material and the low melting point glass are different from each other in various properties and have been used in different purposes, depending on environments, in which they can be used. In general, the glasses have been used in the case where heat resistance and airtightness capability are in preference, and organic materials represented by the polymer materials have been used in the case where other characteristics than heat resistance and airtightness capability are in preference. Along with the recent advance in technology, other characteristics that have not been demanded receive attention, and materials having such characteristics are expected to be developed.

Under the circumstances, polymer materials that are improved in heat resistance and airtightness capability and glasses having a lowered softening range, i.e., so-called low melting point glass, are actively developed. In the market of electronic materials, in which heat resistance and airtightness capability are demanded, particularly, the low melting point glasses represented by $PbO$—$SiO_2$—$B_2O_3$ glass and $PbO$—$P_2O_5$—$SnF_2$ glass is becoming an essential material in the field of sealing and covering electronic parts. The low melting point glass is low in energy required for production and shaping, which brings about reduction in production cost, as compared to high melting point glass, and therefore, it conforms to the recent social request of energy saving. Furthermore, in the case where it can be melted at a temperature, at which an organic substance having optical functionality is not broken, it can be expected to be used in such an application as a host of an optically active organic substance-containing (nonlinear) optical material in an optical information communication device, such as an optical switch. Accordingly, such a material that has heat resistance and airtightness capability, which are characteristics of ordinary molten glass, and tends to obtain various properties like polymer materials is demanded in various fields, and in particular, low melting point glass receives growing anticipation. Moreover, organic-inorganic hybrid glass receives attention as one kind of the low melting point glasses.

As the low melting point glass, for example, Tick glass, such as Sn—Pb—P—F—O series glass (see P. A. Tick, Physics and Chemistry of Glasses, Vol. 25, No. 6, pp. 149-154 (1984)), is well known in the art, which has been used in limited fields of market owing to the glass transition point thereof at about 100° C. and to the excellent water resistance thereof. However, the low melting point glass contains lead in the major constitutional components, and therefore, it is necessarily replaced with other materials according to the recent trend in environmental protection. Furthermore, the characteristics demanded in the low melting point glasses represented by Tick glass are widely changing, and simultaneously, the demands therefor are also diversified.

As an ordinary production process of glass, the melting method and the low temperature synthesizing method have been known. The melting method is such a method that glass raw materials are melted by direct heating to be vitrified. Many kinds of glass are produced by this method, and the low melting point glass is also produced by this method. In the case where the low melting point glass is produced, however, there are many limitations in glass composition, for example, lead, alkali, bismuth and the like are necessarily included for lowering the melting point.

In the amorphous bulk low temperature synthesizing method, on the other hand, the sol-gel method, the liquid phase reaction method and the non-aqueous acid-base reaction method are being considered. In the sol-gel method, a metal alkoxide or the like is subjected to hydrolysis and polycondensation and treated at a temperature exceeding 500° C. (as described in K. Kamiya, S. Sakka and N. Tashiro, Yogyo Kyokaishi, vol. 84, pp. 614-618 (1976)), generally from 700 to 1,600° C., to obtain a bulk body. In the case where the bulk body produced by the sol-gel method is considered as a practical material, however, it is liable to be a porous material due to decomposition and combustion of organic substances, such as an alcohol, introduced upon preparation of the raw material solution, evaporation emission of a decomposition gas of the organic substance or water through the heating process, which brings about problems in heat resistance and airtightness capability. Accordingly, there are many problems in the bulk production by the sol-gel method, and in particular the low melting point glass has not yet been produced by the sol-gel method.

The liquid phase reaction method has such a problem that it is of low productivity. In addition, hydrofluoric acid or the like is used in the reaction system, and it is limited to production of thin films. Therefore, it is practically substantially impossible to use as a method for producing bulk bodies.

The non-aqueous acid-base reaction method is a method being developed recently, by which organic-inorganic hybrid glass as one kind of the low melting point glass can be produced (as described in M. Takahashi, H. Niida and T. Yokoo, New Glass, vol. 17, pp. 8-13 (2002)), but the method is under development and cannot produce all kinds of the low melting point glass.

Under the circumstances, many kinds of the low melting point glass have been produced by the melting method rather than the low temperature synthesizing method. Therefore, the glass composition is limited due to the operation of melting the glass raw materials, and the kinds of the low melting glass that can be produced thereby are considerably restricted.

The low melting point glass is currently an important material owing to the heat resistance and the airtightness capability thereof, and there are many cases where demanded features are submitted as those for the low melting point glass as a representative. However, the material is not limited to the low melting point glass, and there is no particular problem in a low melting point material or low softening point material other than glass if it meets the demanded features.

There are such known techniques as the production process of quartz glass fibers by the sol-gel method (as described in JP-A-62-297236), the production process of titanium oxide fibers by the sol-gel method (as described in JP-A-62-223323) and the production process of a semiconductor-doped matrix by the sol-gel method (as described in JP-A-1-183438). There are also such known technique as the $P_2O_5$—$TeO_2$—$ZnF_2$ series low melting point glass produced by the melting method (as described in JP-A-7-126035) and the organic-inorganic hybrid glass precursor composition and the hybrid glass produced therewith (as described in JP-A-2-137737).

Many kinds of the low softening point material, particularly the low melting point glass, have been produced by the melting method. Therefore, the glass composition is very limited, and the kinds of the low melting glass that can be produced thereby are considerably restricted due to the operation of melting the glass raw materials.

In the case where it is produced by the sol-gel method of the low temperature synthesizing method, on the other hand, a treatment temperature of 500° C. or higher is required for densification. However, no low melting point glass can be obtained at that temperature, and as a result, low melting point glass excellent in heat resistance and airtightness capability could not be obtained. Particularly in the field of electronic material, such low melting point glass has not been available that can be used under severe requirements in heat resistance, airtightness capability and lower melting temperature. Furthermore, low melting point materials other than a glass that satisfies the heat resistance and the airtightness capability have not found either so far.

The methods disclosed in JP-A-62-297236, JP-A-62-223323 and JP-A-1-183438 succeeded in producing materials that had been produced only at high temperature melting, at low temperature, but cannot produce the low melting point glass. Furthermore, a treatment at 500° C. or higher is required after the sol-gel method. JP-A-7-126035 discloses a method capable of producing a glass having a glass transition point of three hundreds and dozens degrees centigrade. However, there has been no instance where a glass having a glass transition point thereunder is produced by using no melting point lowering material, such as lead and bismuth. Moreover, it is uncertain in the method disclosed in JP-A-2-137737 as to the degree of lowering melting point of bulk-form glasses.

Accordingly, such glass that simultaneously satisfies the severe heat resistance and airtightness capability and the low melting point characteristics could not be produced by the conventional production processes. Even materials other than glass have not satisfied such characteristics.

Furthermore, there has been no such glass that simultaneously satisfies the heat resistance and airtightness capability and can be colored or be fluorescently colored. There has been no material other than glass that satisfies such characteristics.

SUMMARY OF THE INVENTION

An object of the invention is to provide a process for producing such glass that simultaneously satisfies heat resistance, airtightness and low melting point characteristics.

According to a first aspect of the present invention, there is provided, in a process for producing an organic-inorganic hybrid glassy material, a process for producing an organic-inorganic hybrid glassy material comprising at least three steps of producing a gel body by a sol-gel method; melting by heating; and aging.

Furthermore, according to the first aspect, there is provided an organic-inorganic hybrid glassy material produced by the process of the first aspect.

According to a second aspect of the present invention, there is provided an organic-inorganic hybrid glassy material obtained by melting a gel body formed by a sol-gel method. The organic-inorganic hybrid glassy material is characterized in that it has been aged in the aging step after the melting step and that it contains at least one kind of a substance represented by formula $R_nSiO_{(4-n)/2}$ (wherein R represents an organic functional group, and n represents a number of from 1 to 3).

Furthermore, according to the second aspect of the present invention, there is provided an organic-inorganic hybrid glassy material obtained by melting a gel body formed by a sol-gel method. The organic-inorganic hybrid glassy material is characterized in that it has been aged in the aging step after the melting step, that it contains a substance represented by $MO—RSiO_{3/2}$ or $MO—R_2SiO$ (wherein R represents an organic functional group, and M represents a divalent metal), and that M is at least one kind selected from Mg, Ca, Sr, Ba and Sn.

According to a third aspect of the present invention, there is provided an organic-inorganic hybrid glassy material containing no lead and mainly containing silica. The organic-inorganic hybrid glassy material is characterized in that the softening temperature is 300° C. or lower.

According to a fourth aspect of the present invention, there is provided, in the case of producing an organic-inorganic hybrid glassy material, a process for producing an organic-inorganic hybrid glassy material that is characterized in that a gel body produced by a sol-gel method and a substance obtained by an non-aqueous acid-base reaction method are mixed together, followed by melting by heating and then aging.

Furthermore, according to the fourth aspect of the present invention, there is provided an organic-inorganic hybrid glassy material produced by the process of the fourth aspect.

DETAILED DESCRIPTION

The following descriptions relate to all the first to fourth aspects of the invention unless otherwise indicated.

According to the invention, such an organic-inorganic hybrid glassy material can be produced that simultaneously satisfies heat resistance, airtightness capability and low melting point characteristics, while it has been significantly difficult to be produced.

The organic-inorganic hybrid glassy material of the invention can be utilized in the field where low melting point glass is used, for example, sealing and covering materials of display parts, such as PDP, materials for optical information communication devices, such as optical switch and optical coupler, materials for optical devices, such as LED chip, optically functional (nonlinear) optical material, and adhesive materials, and in the field where organic materials, such as epoxy resin, are used.

The organic-inorganic hybrid glassy material of the invention can also be used as a low melting point glass material, an optically functional material, such as optical waveguide, fluorescent material and photocatalyst, and a sealing material for wet solar battery, electronic material board and the like. It can also be used as functional fibers, such as optical fibers, and a functional thin film. It can further be applied, alone or after combining with other materials, to various fields including architectural materials and vehicle materials.

According to the present invention, the process for producing an organic-inorganic hybrid glassy material has at least three steps, i.e., the production step of a gel body by a sol-gel method; a melting step by heating; and an aging step. All the steps are essential and have important roles.

The technique used in the invention is fundamentally different from conventional sol-gel methods. In the conventional sol-gel methods, after mixing several kinds of sol-gel raw materials, the mixture is stirred for a few hours at room temperature and allowed to stand for from 2 days to 1 week at room temperature to obtain a wet gel. Thereafter, it is dried at room temperature to about 100° C. for from 1 to 3 days to obtain a dry gel. The dry gel is pulverized, washed and filtered depending on necessity, and then sintered at a temperature of 400° C. or higher, generally 800° C. or higher, to obtain a bulk body or a fibrous material. In the case where a film is produced, the material in a sol state is formed into a thin film, which is then dried and sintered to obtain a thin film. In the case where the gel body is sintered as it is, a transparent material, for example, can be obtained, but a material having a low melting point cannot be obtained.

The conventional sol-gel method has no concept of melting the gel body, but it has directly been subjected to the sintering step. In the conventional sol-gel method, accordingly, it has been recognized that the dry gel does not turn into a melted state. For example, JP-A-2-137737 completely fails to disclose the concept of melting property. The gel body obtained in the invention, on the other hand, can turn into a melted state by heating. Furthermore, the characteristic feature of the invention also resides in the aging step after the melting step. However, the aging referred in the invention is a concept completely different from the aging that has been referred by some researchers with respect to the conventional sol-gel methods. That is, the aging in the invention does not mean a still standing carried out over 2 days to 1 week for obtaining a wet gel but means such an operation that the melted organic-inorganic hybrid glass is positively subjected to a structural change to stabilize the glassy material. Therefore, it has a characteristic of a treatment at a temperature higher than that for the still standing condition and in some cases a characteristic of a treatment under reduced pressure.

In the conventional sol-gel method, the melting step is not contained, but the dry gel is sintered as it is, and therefore, the subsequent aging step is not contained, either. However, this aging step is significantly important, and a desired organic-inorganic hybrid glassy material cannot be obtained without conducting the subsequent aging step even if it is a glassy material having meltability. Reaction active hydroxyl groups (—OH) remain in the system upon simply conducting the melting, and even when this is solidified by cooling, the remaining hydroxyl groups (—OH) cause a hydrolysis-dehydration condensation reaction to cause cracks and breakage as a result. Thus, an organic-inorganic hybrid glassy material in good condition cannot be obtained. Accordingly, it is a significantly important step that the reaction active hydroxyl groups (—OH) are stabilized in the glassy material by aging. The invention is considerably different from the conventional sol-gel methods in these points.

The starting material is a metal alkoxide, a metal acetylacetonato, a metal carboxylic acid, a metal hydroxide or a metal halide, and a gel body is firstly produced by the sol-gel method. The starting material may also be a material that is used for the sol-gel methods and is not limited to the above-mentioned starting materials. The step of producing the gel body is the first important step. For example, as a preferred example of the metal alkoxide, a silicon alkoxide (alkoxysilane) containing a phenyl group is cited. The number of the alkoxyl groups in this silicon alkoxide may be from 1 to 3. The carbon number of each alkoxy group may be from 1 to 4.

In the first and second aspects of the invention, the gel body structure produced by the sol-gel method preferably contains a metal unit having an organic functional group. In the case where the gel body structure produced does not contain a metal unit having an organic functional group, the gel body cannot be melted, although it can be sintered. This metal unit is characterized by having the organic functional group R, examples of which include a silicon unit represented by $R_n SiO_{(4-n)/2}$ (n=1-3). Herein, n represents a natural number and is selected from 1, 2 and 3. More specifically, a metal unit containing a phenyl group ($Ph_n SiO_{(4-n)/2}$) is more preferable. Combinations with a metal unit of a methyl group ($Me_n SiO_{(4-n)/2}$), a metal unit of an ethyl group ($Et_n SiO_{(4-n)/2}$), a metal unit of a butyl group ($Bt_n SiO_{(4-n)/2}$) (n=1-3) or the like are also effective.

The second aspect of the present invention provides an organic-inorganic hybrid glassy material obtained by melting a gel body formed by a sol-gel method. It has been aged in the aging step after the melting step. It may be an organic-inorganic hybrid glassy material containing at least one kind of a substance represented by formula $R_n SiO_{(4-n)/2}$ (wherein R represents an organic functional group, and n represents a number of from 1 to 3).

The above organic functional group R is typically an aryl group or alkyl group. Examples of the aryl group include a phenyl group, a pyridyl group, a tolyl group and a xylyl group, and a phenyl group is particularly preferable. Examples of the alkyl group include a methyl group, an ethyl group, an n- or i-propyl group, an n-, i- or t-butyl group, a pentyl group and a hexyl group (carbon number: 1-20), and a methyl group and an ethyl group are particularly preferable. The organic functional group is not limited to the aforementioned alkyl groups and aryl groups. The alkyl group may be a linear, branched or cyclic alkyl group. According to the aforementioned points, it is preferable to use at least one kind of a sol-gel raw material containing a phenyl group.

The melting step by heating in the invention is preferably carried out at a temperature of from 30 to 400° C. In the case of a temperature lower than 30° C., melting cannot be achieved substantially. In the case where the temperature exceeds 400° C., the organic group bonded to the metal element constituting the network is burnt out, whereby not only the organic-inorganic hybrid glassy material cannot be obtained, but also it is broken or becomes opaque by causing bubbles. It is preferably from 100 to 300° C.

The aging step of the invention is preferably carried out at a temperature of from 30 to 400° C. In the case of a temperature lower than 30° C., aging cannot be achieved substantially. In the case where the temperature exceeds 400° C., there occurs a possibility of thermal decomposition, and it becomes difficult to obtain a stable glassy material. The temperature is preferably from 60 to 320° C., and more preferably from 100 to 300° C. In the case where the aging temperature is lower than the melting lower limit temperature, its effect becomes considerably small. In general, the aging temperature is preferably from the melting lower limit temperature to about (the melting lower limit temperature+150° C.). The period of time required for aging is 5 minutes or more. While the aging time varies depending on the treating amount, the treating temperature and the allowed remaining amount of the reaction active hydroxyl groups (—OH), it is extremely difficult to achieve a satisfactory level with less than 5 minutes. It is preferably from 10 minutes to 1 week since too long period of time lowers the productivity.

In the melting step by heating or the aging step of the invention, there is such a tendency that the period of time can be shortened by carrying out that in an inert atmosphere or under reduced pressure, which is effective herein. Microwave heating and ultrasonic heating are also effective.

The invention includes all kinds of the organic-inorganic hybrid glassy materials that have been produced in the aforementioned process, and such an organic-inorganic hybrid glassy material is preferable that has a random network structure in a part or the whole thereof.

In the invention, the softening temperature is preferably 400° C. or less. If the softening temperature exceeds 400° C., the organic groups bonded to the metal elements constituting the network are burnt out, whereby not only the organic-inorganic hybrid glassy material cannot be obtained, but also the material is broken or becomes opaque by causing bubbles. It is preferably from 50 to 350° C., and more preferably from 60 to 300° C. It is significantly preferable that the softening temperature before aging is from 60 to 150° C. and that the softening temperature after aging is from 100 to 300° C. In the invention, the softening point is determined by the contraction amount change in the TMA measurement where the temperature increased with 10° C./min, and its staring temperature is defined as the softening temperature.

In the second aspect of the invention, the softening temperature of the organic-inorganic hybrid glassy material is preferably from 80 to 400° C. In the case where it is less than 80° C., the organic-inorganic hybrid glassy material thus obtained is low in chemical stability. In the case where it exceeds 400° C., there are many cases where the material has no meltability. It is more preferably from 100 to 380° C. The softening temperature of the organic-inorganic hybrid glassy material can be determined by the TMA measurement where the temperature has been increased with 10° C./min. That is, the contraction amount is measured under the aforementioned condition, and the change starting temperature of the contraction amount is defined as the softening temperature.

In the invention, the gel body produced by the sol-gel method has a characteristic of meltability. The meltability referred herein means such a characteristic that it can be melted, i.e., the viscosity is largely lowered by heating to have a so-called melted state. As being different from the conventional sol-gel methods, the invention is characterized in that the melting step is essential, too. Furthermore, it is characterized in that it is aged by the aging step after the melting step. The second aspect of the invention relates to an organic-inorganic hybrid glassy material containing at least one kind of a substance represented by $R_nSiO_{(4-n)/2}$, wherein n represents a natural number selected from 1, 2 and 3.

In the invention, an organic-inorganic hybrid glassy material containing a phenyl group is preferable. The reason is that there are many cases where the organic-inorganic hybrid glassy material containing a phenyl group has meltability and can be subjected to aging control and where it falls within the aforementioned ranges and is extremely stable.

The second aspect of the invention provides an organic-inorganic hybrid glassy material obtained by melting a gel body formed by a sol-gel method. The organic-inorganic hybrid glassy material is also preferably one that has been aged in the aging step after the melting step and that contains a substance represented by $MO-RSiO_{3/2}$ or $MO-R_2SiO$ (wherein R represents an organic functional group, and M represents a divalent metal) wherein M is at least one kind selected from Mg, Ca, Sr, Ba and Sn.

In the second aspect of the invention, the organic-inorganic hybrid glassy material containing a substance represented by $MO-RSiO_{3/2}$ or $MO-R_2SiO$ (wherein R represents an organic functional group, and M represents a divalent metal) is extremely important, and the presence of the substance of this glass system can simultaneously satisfy heat resistance, airtight capability and lower melting point, which are quite difficult to be attained at the same time.

The above divalent metal M is preferably at least one kind selected from Mg, Ca, Sr, Ba and Sn, and Sn is particularly preferable.

In the second aspect of the invention, the properties and the coloration of the organic-inorganic hybrid glassy material can be easily changed. For example, an organic-inorganic hybrid glassy material improved in glass properties, such as water resistance, can be obtained by introducing Nb, Zr, Ti or the like in the form of an oxide, and an organic-inorganic hybrid glassy material changed in various properties can be obtained by introducing a transition metal ion, such as V, Cr, Mn, Fe, Co, Ni, Cu and Zn. Furthermore, an organic-inorganic hybrid glassy material having been colored or fluorescently colored can be obtained by containing a rare earth ion (such as Ce, Pr, Nd, Pm, Sm, Eu, Gd, Tb, Dy, Ho, Er and Tm) or an organic colorant.

In the second aspect of the invention, such an organic-inorganic hybrid glassy material is preferable that is changed in softening temperature by conducting aging. This is because there are many cases where an organic-inorganic hybrid glassy material that is not changed in softening temperature does not exhibit meltability. In this case, it is more preferable that there is such a tendency that the softening temperature is increased by aging. It is particularly preferable that the softening temperature before aging is from 60 to 150° C., and the softening temperature after aging is from 100 to 300° C.

In the invention, such an organic-inorganic hybrid glassy material is preferable that exhibits airtight property with no exudation of an organic colorant for one month. While there are many organic-inorganic hybrid glasses having a problem in airtightness, an organic-inorganic hybrid glassy material having meltability and being capable of subjecting to aging as in the invention is improved in airtightness.

The third aspect of the invention is characterized in that the organic-inorganic hybrid glassy material contains no lead and mainly contains silica and that the organic-inorganic hybrid glassy material has a softening temperature of 300° C. or lower.

In the organic-inorganic hybrid glassy material according to the third aspect of the invention, it is important that at least one kind selected from Li, Na, K, B, P, Zr, Ta, Ge and Sn is added thereto. It is necessary that at least one kind of the aforementioned additives is added. In the absence of the additive, it is extremely difficult to obtain an organic-inorganic hybrid glassy material containing no lead, containing mainly silica, and having a softening temperature of 300° C. or lower.

The organic-inorganic hybrid glassy material according to the third aspect of the invention is such an organic-inorganic hybrid glassy material that contains a metal unit having an organic functional group R. In the case where it does not contain the metal unit having an organic functional group R in this substance, it is extremely difficult to obtain an organic-inorganic hybrid glassy material containing no lead, containing mainly silica, and having a softening temperature of 300° C. or lower. As examples of this organic functional group R, those exemplified for the aforementioned organic functional group R can be cited.

The third aspect of the invention provides an organic-inorganic hybrid glassy material produced the sol-gel method or the non-aqueous acid-base reaction method.

In the third and fourth aspects of the invention, the starting raw material of the sol-gel method is a metal alkoxide, a metal acetylacetonato, a metal carboxylate, a metal nitrate, a metal hydroxide or a metal halide, and one having a phenyl group is particularly preferable. A gel body is firstly produced by the sol-gel method using such starting material. In the invention, it is needless to say that silicon is considered as a metal. The starting material may also be other materials as long as they are used in sol-gel method. It is not limited to the above starting materials. As a starting material in the non-aqueous acid-base reaction method, for example, trialkylchlorosilane ($R_3SiCl$), dimethyldichlorosilane ($Me_2SiCl_2$) and phosphoric acid (e.g., $H_3PO_4$ and $H_3PO_3$) are often used, but it is not limited to the above raw material. In an ordinary non-aqueous acid-base reaction method, it is not necessary to conduct the melting and aging steps as those of the sol-gel method.

In the case of producing an organic-inorganic hybrid glassy material, the fourth aspect of the invention provides a process for producing an organic-inorganic hybrid glassy material, in which a gel body produced by a sol-gel method and a substance obtained by an non-aqueous acid-base reaction method are mixed together, followed by melting with heating and then aging. It is necessary at first to have a step of mixing the gel body and the substance produced by the two different methods. In the absence of this mixing step, it is not possible to produce an organic-inorganic hybrid glassy material that has advantages of both.

In the process for producing an organic-inorganic hybrid glassy material according to the fourth aspect of the invention, the gel body produced by the sol-gel method preferably contains $RSiO_{3/2}$ or $R_2SiO$ (wherein R represents an organic functional group). There is a significant meaning that the gel body structure produced by the sol-gel method contains a metal unit having an organic functional group. In the case where the gel body structure thus produced does not contain a metal unit having an organic functional group, the gel body cannot be melted while it can be sintered. As examples of the organic functional group R, the same examples as those of the above organic functional group R can be cited.

In the fourth aspect of the invention, it is extremely important that the substance obtained by the non-aqueous acid-base reaction method contains $R_2SiO$, $P_2O_5$ and SnO from the standpoint of producing the organic-inorganic hybrid glassy material. In the absence of $R_2SiO$, $P_2O_5$ and SnO, it is extremely difficult to obtain such an organic-inorganic hybrid glassy material that has heat resistance and airtight capability and has low temperature meltability.

In the fourth aspect of the invention, it is the next important step that the mixture of the gel body and the substance is heated to have a melted state. In the conventional sol-gel methods, for example, there is almost no concept of melting the gel body, but it has directly been subjected to the sintering step. In this case, for example, a transparent material having a high melting point can be obtained by melting the gel body as it is, but a low melting point material cannot be obtained.

In the fourth aspect of the invention, the aforementioned two procedures are combined to obtain a low melting point glass that simultaneously satisfies severe requirements in heat resistance, airtightness capability and low melting temperature, which have been difficult to be attained. Furthermore, the required properties thereof can also be easily obtained.

The invention will be described with reference to the following examples, but the invention is not limited to the following examples. In particular, the first aspect of the invention will be described with reference to Examples 1-1 to 1-5, the second aspect of the invention will be described with reference to Examples 2-1 to 2-20, the third aspect of the invention will be described with reference to Examples 3-1 to 3-3, and the fourth aspect of the invention will be described with reference to Examples 4-1 and 4-2.

EXAMPLE 1-1

Phenyltriethoxysilane ($PhSi(OEt)_3$) as a metal alkoxide and ethanol were used as starting materials. In a vessel, hydrochloric acid as a catalyst was added to 10 ml of phenyltriethoxysilane, 40 ml of water, and 30 ml of ethanol, followed by stirring at room temperature for 1 day to cause gelation. Thereafter, a drying was conducted at about 100° C., and the gel body was melted at 120° C. for 2 hours, followed by aging at 200° C. for 5 hours, thereby obtaining a transparent material. It was confirmed that the transparent material contained a silicon unit $R_nSiO_{(4-n)/2}$ (wherein R represents an organic functional group, and n represents a number of from 1 to 3) as one metal unit by using a nuclear magnetic resonance apparatus, Model CMX-400 of JEOL, Ltd.

This transparent material had a softening temperature of 115° C., which was lower than about 400° C. that is the decomposition temperature of phenyl group. In view of that it had a random network structure, the transparent material thus obtained is a substance having an organic-inorganic hybrid glass structure, i.e., the organic-inorganic hybrid glassy material.

In order to evaluate the airtightness capability of the organic-inorganic hybrid glassy material, an organic colorant was added to the organic-inorganic hybrid glassy material, and the exudation condition thereof after 1 month was observed. As a result, no exudation was observed, and it was found that the airtightness capability was satisfied. The glass transition point of the organic-inorganic hybrid glassy material after allowing it to stand in an atmosphere of 100° C. for 300 hours was measured. Its change was not found, and thus it was confirmed that no problem arose in heat resistance. The obtained organic-inorganic hybrid glassy material was then allowed to stand in the air for 1 month, but no particular change was found therein, and thus it was confirmed that the material was excellent in chemical durability.

Figure 1:
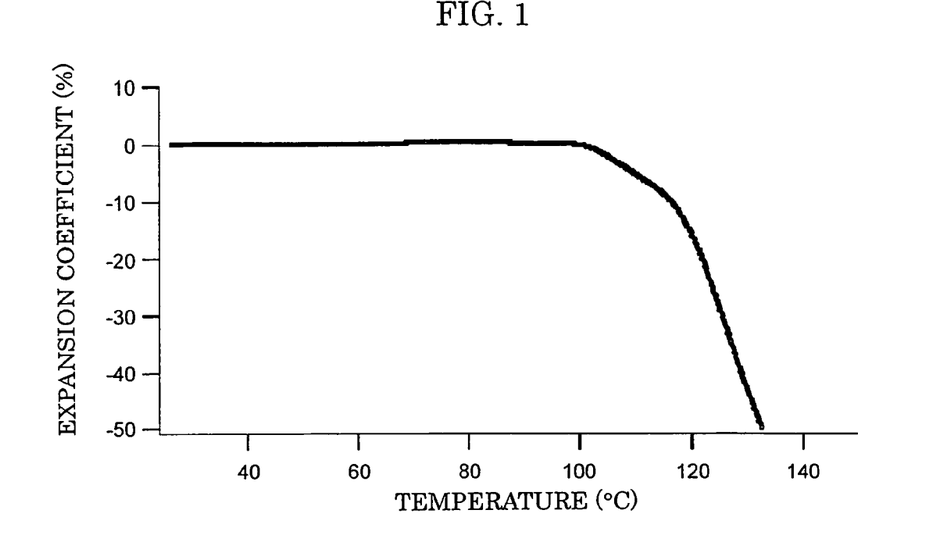
FIG. 1 is a graph showing the measurement data of softening temperature (TMA measurement results) of Example 1-1 according to the first aspect of the invention.

As shown in FIG. 1, the softening temperature of the organic-inorganic hybrid glassy material was determined by the TMA measurement with a temperature increasing rate of 10° C. per minute. FIG. 1 shows the result of this example. That is, the softening behavior was determined from the change in the contraction amount under the aforementioned conditions, and the starting temperature thereof was designated as a softening temperature.

EXAMPLE 1-2

Figure 2:
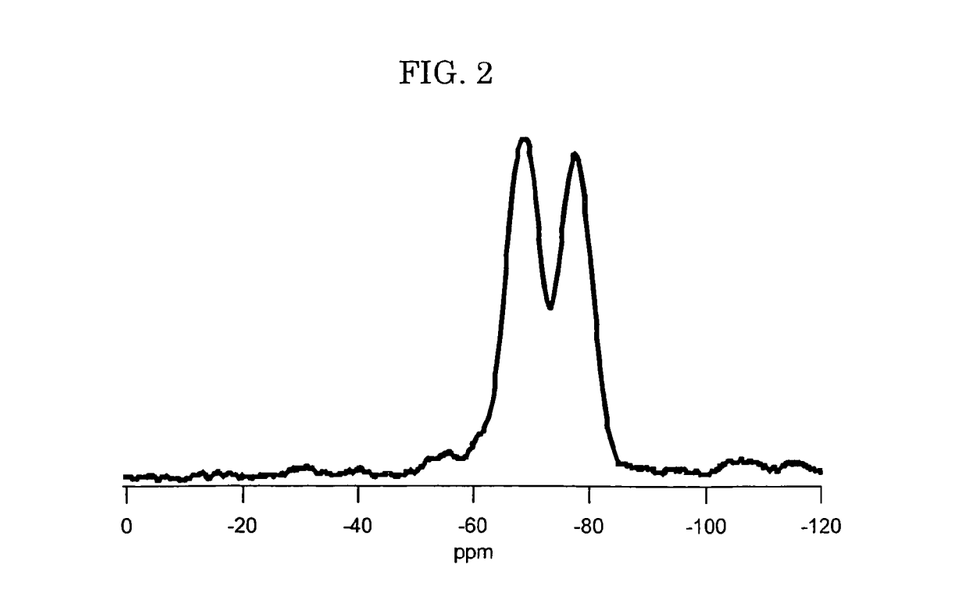
FIG. 2 is a graph showing the NMR measurement data of Example 1-2 according to the first aspect of the invention.

A mixed system of phenyltriethoxysilane ($PhSi(OEt)_3$) and methyltriethoxysilane ($MeSi(OEt)_3$) in a ratio of 9/1 as a metal alkoxide was used as a starting material. In a vessel, acetic acid as a catalyst was added to 10 ml of phenyltriethoxysilane, 1 ml of methyltriethoxysilane, 40 ml of water, and 30 ml of ethanol, followed by stirring at room temperature for 2 days to cause gelation. Thereafter, it was dried at about 100° C., and then the gel body was melted at 120° C. for 1 hour, followed by aging at 180° C. for 3 days, to obtain a transparent material. It was confirmed that this transparent material contained a silicon unit $R_nSiO_{(4-n)/2}$ (wherein R represents an organic functional group, and n represents a number of from 1 to 3) as one metal unit by using a nuclear magnetic resonance apparatus, Model CMX-400 of JEOL, Ltd., as shown in FIG. 2.

This transparent material had a softening temperature of 119° C. and had a random structure. Under consideration of these, the transparent material thus obtained is a substance having an organic-inorganic hybrid glass structure, i.e., the organic-inorganic hybrid glassy material.

Figure 3:
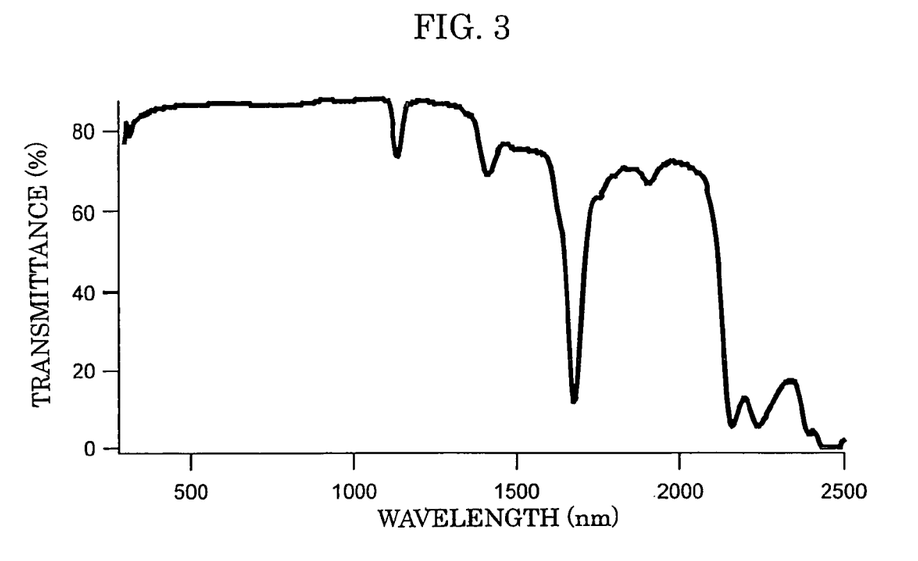
FIG. 3 is a graph showing the UV-visible region transmission spectrum data of Example 1-2 according to the first aspect of the invention.

Furthermore, as shown in FIG. 3, the organic-inorganic hybrid glassy material was measured for a transmission curve in a wavelength range of from 300 to 2,500 nm by using a self-recording spectrophotometer, Model U-3500 of Hitachi, Ltd. The data of a solid line corresponds to this. As is clear from this result, it is understood that coloration in the visible region, particularly absorption in the blue region, which had been found in the conventional products, was not observed. The average transmittance in a wavelength of from 300 to 800 nm was 85.7%.

In order to evaluate the airtightness capability of the organic-inorganic hybrid glassy material, an organic colorant was added to the organic-inorganic hybrid glassy material, and exudation condition thereof after 1 month was observed. As a result, no exudation was observed, and it was found that the airtightness capability was satisfied. The glass transition point of this organic-inorganic hybrid glassy material after allowing it to stand in an atmosphere of 100° C. for 300 hours was measured. Its change was not found, and thus it was confirmed that no problem arose in heat resistance. The organic-inorganic hybrid glassy material was then allowed to stand in the air for 1 month, but no particular change was found therein, and thus it was confirmed that the material was excellent in chemical durability.

EXAMPLE 1-3

A mixed system of phenyltriethoxysilane and diethoxydiphenylsilane ($Ph_2Si(OEt)_2$) in a ratio of 7/3 as a metal alkoxide was used as a starting material. In a vessel, acetic acid as a catalyst was added to 9 ml of phenyltriethoxysilane, 4 ml of diethoxydiphenylsilane, 40 ml of water, and 30 ml of ethanol, followed by stirring at room temperature for 2 days to cause gelation. Thereafter, it was dried at about 100° C., and then the gel body was melted at 120° C. for 1 hour, followed by aging at 200° C. for 4 days, to obtain a transparent material. It was confirmed that the transparent material contained a silicon unit $R_nSiO_{(4-n)/2}$ (wherein R represents an organic functional group, and n represents a number of from 1 to 3) as one metal unit by using a nuclear magnetic resonance apparatus, Model CMX-400 of JEOL, Ltd.

The transparent material had a softening temperature of 116° C. and had a random network structure. Under consideration of these, the transparent material thus obtained is a substance having an organic-inorganic hybrid glass structure, i.e., an organic-inorganic hybrid glassy material. In order to evaluate the airtightness capability of the organic-inorganic hybrid glassy material, an organic colorant was added to the organic-inorganic hybrid glassy material, and exudation condition thereof after 1 month was observed. As a result, no exudation was observed, and it was found that the airtightness capability was satisfied. The glass transition point of the organic-inorganic hybrid glassy material after allowing it to stand in an atmosphere at 100° C. for 300 hours was measured. No change in glass transition point was found, and thus it was confirmed that no problem arose in heat resistance. The obtained organic-inorganic hybrid glassy material was then allowed to stand in the air for 1 month, but no particular change was found therein, and thus it was confirmed that the material was excellent in chemical durability.

EXAMPLE 1-4

A mixed system of phenyltriethoxysilane and diethoxydimethylsilane ($Me_2Si(OEt)_2$) in a ratio of 8/2 as a metal alkoxide was used as a starting material. In vessel, acetic acid as a catalyst was added to 10 ml of phenyltriethoxysilane, 2 ml of diethoxydimethylsilane, 40 ml of water and 30 ml of ethanol, followed by stirring at room temperature for 2 days to cause gelation. Thereafter, it was dried at about 100° C., and then the gel body was melted at 120° C. for 1 hour, followed by aging at 200° C. for 1 day, to obtain a transparent material. It was confirmed that the transparent material contained a silicon unit $R_nSiO_{(4-n)/2}$ (wherein R represents an organic functional group, and n represents a number of from 1 to 3) as one metal unit by using a nuclear magnetic resonance apparatus, Model CMX-400 of JEOL, Ltd.

The transparent material had a softening temperature of 125° C. and had a random network structure. Under consideration of these, the transparent material thus obtained is a substance having an organic-inorganic hybrid glass structure, i.e., an organic-inorganic hybrid glassy material. In order to evaluate the airtightness capability of the organic-inorganic hybrid glassy material, an organic colorant was added to the organic-inorganic hybrid glassy material, and exudation condition thereof after 1 month was observed. As a result, no exudation was observed, and it was found that the airtightness capability was satisfied. The glass transition point of the organic-inorganic hybrid glassy material after allowing it to stand in an atmosphere of 100° C. for 300 hours was measured. Its change was not found, and thus it was confirmed that no problem arose in heat resistance. The organic-inorganic hybrid glassy material was then allowed to stand in the air for 1 month, but no particular change was found therein, and thus it was confirmed that the material was excellent in chemical durability.

EXAMPLE 1-5

A mixed system of phenyltriethoxysilane and diethoxydiethylsilane ($Et_2Si(OEt)_2$) in a ratio of 9/1 as a metal alkoxide was used as a starting material. In a vessel, acetic acid as a catalyst was added to 10 ml of phenyltriethoxysilane, 1 ml of diethoxydiethylsilane, 40 ml of water, and 30 ml of ethanol, followed by stirring at room temperature for 2 days to cause gelation. Thereafter, it was dried at about 100° C., and then the gel body was melted at 120° C. for 1 hour, followed by aging at 200° C. for 1 day, to obtain a transparent material. It was confirmed that the transparent material contained a silicon unit $R_nSiO_{(4-n)/2}$ (wherein R represents an organic functional group, and n represents a number of from 1 to 3) as one metal unit by using a nuclear magnetic resonance apparatus, Model CMX-400 of JEOL, Ltd.

The transparent material had a softening temperature of 121° C. and had a random network structure. Under consideration of these, the transparent material thus obtained is a substance having an organic-inorganic hybrid glass structure, i.e., an organic-inorganic hybrid glassy material. In order to evaluate the airtightness capability of the organic-inorganic hybrid glassy material, an organic colorant was added to the organic-inorganic hybrid glassy material, and exudation condition thereof after 1 month was observed. As a result, no exudation was observed, and it was found that the airtightness capability was satisfied. The glass transition point of the organic-inorganic hybrid glassy material after allowing it to stand in an atmosphere at 100° C. for 300 hours was measured. No change in glass transition point was found, and thus it was confirmed that no problem arose in heat resistance. The organic-inorganic hybrid glassy material was then allowed to stand in the air for 1 month, but no particular change was found therein, and thus it was confirmed that the material was excellent in chemical durability.

COMPARATIVE EXAMPLE 1-1

A gel body was obtained by a sol-gel method using substantially the same raw materials as those of Example 1-1. Immediately after the gel body was dried at about 100° C., it was sintered at about 600° C. As a result, a substance thus obtained turned black and was not softened even at 800° C. Thus, it could not be recognized as a low melting point material.

COMPARATIVE EXAMPLE 1-2

A gel body was obtained by a sol-gel method using substantially the same raw materials as those of Example 1-1. The gel body was melted at 135° C. for 1 hour, and an aging was tried at 20° C. Although treated at 20° C. for 1 week, this substance was such an unstable product that changed in, for example, softening temperature with the time and the treating temperature. Thus, it was not a stable glassy material.

COMPARATIVE EXAMPLE 1-3

A gel body was obtained by a sol-gel method using substantially the same raw materials as those of Example 1-2. The gel body was melted at 500° C. for 5 hours, and an aging was tried at 550° C. As a result, a substance thus obtained had a brown color and was not softened even at 800° C. Thus, it could not be recognized as a low melting point material.

EXAMPLE 2-1

A mixed system of about 10 ml of phenyltriethoxysilane (PhSi(OEt)$_3$) and about 2 ml of ethyltriethoxysilane (EtSi(OEt)$_3$) as a metal alkoxide was used as a starting material, and the molar ratio thereof was 8/2. About 3 ml of water, about 30 ml of ethanol and about 0.5 ml of hydrochloric acid as a catalyst were added to the phenyltriethoxysilane and the ethyltriethoxysilane in a vessel, followed by stirring at room temperature for 2 hours to cause gelation. Thereafter, it was dried at about 100° C., and then the gel body was melted at 110° C. for 1 hour, followed by aging at 180° C. for 3 days, to obtain a transparent material.

Figure 4:
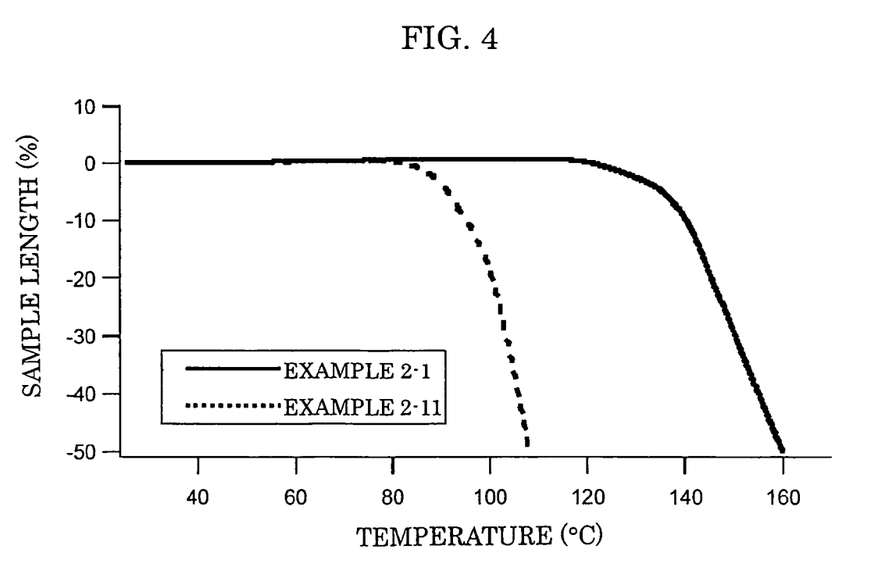
FIG. 4 is a graph showing the measurement data of softening temperature (TMA measurement results) of Examples 2-1 and 2-11 according to the second aspect of the invention.

The softening behavior starting point was determined from the change in contraction amount in the TMA measurement with a temperature increasing rate of 10° C. per minute, and its starting temperature was designated as a softening temperature. With this, the softening temperature of this material was found to be 135° C. The TMA curve of this material is shown in FIG. 4. It was confirmed that a silicon unit $R_n SiO_{(4-n)/2}$ (wherein R represents an organic functional group, and n represents a number of from 1 to 3) was present by using a nuclear magnetic resonance apparatus, Model CMX-400 of JEOL, Ltd. The transparent material had a random network structure. Under consideration of these, the transparent material thus obtained is a substance having an organic-inorganic hybrid glass structure, i.e., an organic-inorganic hybrid glassy material.

In order to evaluate the airtightness capability of the organic-inorganic hybrid glassy material, methylene blue as an organic colorant was added to the glassy material thus obtained, and exudation condition thereof after 1 month was observed. As a result, no exudation was observed, and it was found that the airtightness capability was satisfied. The softening temperature of the organic-inorganic hybrid glassy material after allowing it to stand in an atmosphere at 100° C. for 300 hours was measured. No change in softening temperature was found, and thus it was confirmed that no problem arose in heat resistance. The glassy material thus obtained was then allowed to stand in the air for 1 month, but no particular change was found therein, and thus it was confirmed that the material was excellent in chemical durability.

EXAMPLE 2-2

After the chemical durability test carried out in Example 2-1 (standing in an atmosphere of 100° C. for 300 hours and then in the air for 1 month), the glassy material was further subjected to an aging treatment. In the aging treatment, the first aging was carried out in an atmosphere of about 200° C. and about 0.05 Torr for 5 minutes, and the second aging was carried out in the air at 220° C. for 1 hour, followed by cooling to room temperature. As a result, the softening temperature was changed to 141° C. This glassy material was subjected to the exudation test and the chemical durability test in the same manner as in Example 2-1, and it was confirmed that no problem arose therein.

EXAMPLE 2-3

A transparent material was obtained by using substantially the same raw materials and the same treatment manner as in Example 2-1, provided that an isopropoxide of Ti was added to the raw material.

This material had a softening temperature of 140° C. This material had a refractive index of 1.62, and thus the increase in refractive index owing to the addition of Ti was confirmed. It was confirmed that a silicon unit $R_n SiO_{(4-n)/2}$ (wherein R represents an organic functional group, and n represents a number of from 1 to 3) was present by using a nuclear magnetic resonance apparatus, Model CMX-400 of JEOL, Ltd. The material had a random network structure. Under consideration of these, the transparent material thus obtained is a substance having an organic-inorganic hybrid glass structure, i.e., an organic-inorganic hybrid glassy material.

In order to evaluate the airtightness capability of the organic-inorganic hybrid glassy material, methylene blue as an organic colorant was added thereto, and exudation condition thereof after 1 month was observed. As a result, no exudation was observed, and it was found that the airtightness capability was satisfied. The glass transition point of the organic-inorganic hybrid glassy material after allowing it to stand in an atmosphere of 100° C. for 300 hours was measured. No change therein was found, and thus it was confirmed that no problem arose in heat resistance. The organic-inorganic hybrid glassy material thus obtained was then allowed to stand in the air for 1 month, but no particular change was found therein, and thus it was confirmed that the material was excellent in chemical durability.

EXAMPLE 2-4

After the chemical durability test carried out in Example 2-1 (standing in an atmosphere of 100° C. for 300 hours and in the air for 1 month), the glassy material was further subjected to an aging treatment. In the aging treatment, the first aging was carried out in an atmosphere of about 200° C. and about 0.05 Torr for 5 minutes, and the second aging was carried out in the air at 220° C. for 2 hour, followed by cooling to room temperature. As a result, the softening temperature was changed to 146° C. This glassy material was subjected to the exudation test and the chemical resistance test in the same manner as in Example 2-1, and it was confirmed that no problem arose therein.

EXAMPLE 2-5

A transparent material was obtained by using substantially the same raw materials and the same treatment manner as in Example 2-1, provided that a chloride of Zn was added to the raw material.

The material had a softening temperature of 131° C., and thus reduction in softening temperature owing to the addition of Zn was confirmed. It was confirmed that a silicon unit $R_nSiO_{(4-n)/2}$ (wherein R represents an organic functional group, and n represents a number of from 1 to 3) was present by using a nuclear magnetic resonance apparatus, Model CMX-400 of JEOL, Ltd. The material had a random network structure. Under consideration of these, the transparent material thus obtained is a substance having an organic-inorganic hybrid glass structure, i.e., an organic-inorganic hybrid glassy material.

In order to evaluate the airtightness capability of the organic-inorganic hybrid glassy material, methylene blue as an organic colorant was added thereto, and exudation condition thereof after 1 month was observed. As a result, no exudation was observed, and it was found that the airtightness capability was satisfied. The glass transition point of the organic-inorganic hybrid glassy material after allowing it to stand in an atmosphere of 100° C. for 300 hours was measured. No change therein was found, and thus it was confirmed that no problem arose in heat resistance. The organic-inorganic hybrid glassy material thus obtained was then allowed to stand in the air for 1 month, but no particular change was found therein, and thus it was confirmed that the material was excellent in chemical durability.

EXAMPLE 2-6

After the chemical durability test carried out in Example 2-1 (standing in an atmosphere of 100° C. for 300 hours and in the air for 1 month), the glassy material was further subjected to an aging treatment. In the aging treatment, the first aging was carried out in an atmosphere of about 200° C. and about 0.05 Torr for 5 minutes, and the second aging was carried out in the air at 220° C. for 1 hour, followed by cooling to room temperature. As a result, the softening temperature was changed to 136° C. This glassy material was subjected to the exudation test and the chemical resistance test in the same manner as in Example 2-1, and it was confirmed that no problem arose therein.

EXAMPLE 2-7

A transparent material was obtained by using substantially the same raw materials and the same treatment manner as in Example 2-1, provided that rhodamine 6G as an organic colorant was added to the raw material.

This material had a softening temperature of 136° C., and was substantially uniformly colored. It was confirmed that a silicon unit $R_nSiO_{(4-n)/2}$ (wherein R represents an organic functional group, and n represents a number of from 1 to 3) was present by using a nuclear magnetic resonance apparatus, Model CMX-400 of JEOL, Ltd. The material had a random network structure. Under consideration of these, the transparent material thus obtained is a substance having an organic-inorganic hybrid glass structure, i.e., an organic-inorganic hybrid glassy material.

In order to evaluate the airtightness capability of the organic-inorganic hybrid glassy material, methylene blue as another organic colorant that was different from rhodamine 6G was added thereto, and exudation condition thereof after 1 month was observed. As a result, no exudation was observed, and it was found that the airtightness capability was satisfied. The glass transition point of the organic-inorganic hybrid glassy material after allowing it to stand in an atmosphere of 100° C. for 300 hours was measured. No change therein was found, and thus it was confirmed that no problem arose in heat resistance. The organic-inorganic hybrid glassy material thus obtained was then allowed to stand in the air for 1 month, but no particular change was found therein, and thus it was confirmed that the material was excellent in chemical durability.

EXAMPLE 2-8

After the chemical durability test carried out in Example 2-1 (standing in an atmosphere of 100° C. for 300 hours and in the air for 1 month), the glassy material was further subjected to an aging treatment. In the aging treatment, the first aging was carried out in an atmosphere of about 210° C. and about 0.05 Torr for 5 minutes, and the second aging was carried out in the air at 220° C. for 1 hour, followed by cooling to room temperature. As a result, the softening temperature was changed to 142° C. The glassy material was subjected to the exudation test and the chemical durability test in the same manner as in Example 2-1, and it was confirmed that no problem arose therein.

EXAMPLE 2-9

A transparent material was obtained by using substantially the same raw materials and the same treatment manner as in Example 2-1, provided that Er was added in the form of an chloride to the raw material to effect fluorescence.

This material had a softening temperature of 137° C., and upon observation in dark, it was possible to confirm that the material overall emitted a clear green-color fluorescent light upon exciting with a light having a wavelength of 380 nm. It was confirmed that a silicon unit $R_nSiO_{(4-n)/2}$ (wherein R represents an organic functional group, and n represents a number of from 1 to 3) was present by using a nuclear magnetic resonance apparatus, Model CMX-400 of JEOL, Ltd. The material had a random network structure. Under consideration of these, the transparent material thus obtained is a substance having an organic-inorganic hybrid glass structure, i.e., an organic-inorganic hybrid glassy material.

In order to evaluate the airtightness capability of the organic-inorganic hybrid glassy material, methylene blue as an organic colorant was added thereto, and exudation condition thereof after 1 month was observed. As a result, no exudation was observed, and it was found that the airtightness capability was satisfied. The glass transition point of the organic-inorganic hybrid glassy material after allowing it to stand in an atmosphere of 100° C. for 300 hours was measured. No change therein was found, and thus it was confirmed that no problem arose in heat resistance. The organic-inorganic hybrid glassy material thus obtained was then allowed to stand in the air for 1 month, but no particular change was found therein, and thus it was confirmed that the material was excellent in chemical durability.

EXAMPLE 2-10

After the chemical resistance test carried out in Example 2-1 (standing in an atmosphere at 100° C. for 300 hours and in the air for 1 month), the glassy material was further subjected to an aging treatment. In the aging treatment, the first aging was carried out in an atmosphere of about 210° C. and about 0.05 Torr for 5 minutes, and the second aging was carried out in the air at 220° C. for 2 hour, followed by cooling to room temperature. As a result, the softening temperature was changed to 145° C. This glassy material was subjected to the exudation test and the chemical resistance test in the same manner as in Example 2-1, and it was confirmed that no problem arose therein.

EXAMPLE 2-11

A mixed system of about 10 ml of phenyltriethoxysilane (PhSi(OEt)$_3$) and about 2 ml of ethyltriethoxysilane (EtSi (OEt)$_3$) as a metal alkoxide was used as a starting material, and the molar ratio thereof was 8/2. About 3 ml of water, about 30 ml of ethanol, about 0.5 ml of hydrochloric acid as a catalyst and tin chloride were added to the phenyltriethoxysilane and the ethyltriethoxysilane in a vessel, followed by stirring at room temperature for 2 hours to cause gelation. Thereafter, it was dried at about 100° C., and then the gel body was melted at 110° C. for 1 hour, followed by aging at 190° C. for 4 days, to obtain a transparent material.

The softening behavior starting point was determined from the change in contraction amount in the TMA measurement with a temperature increasing rate of 10° C. per minute, and its starting temperature was designated as a softening temperature. The softening temperature of this material was 95° C. The TMA curve of this material is shown in FIG. 4. It was confirmed that SnO, RSiO$_{3/2}$ and R$_2$SiO were present by using a nuclear magnetic resonance apparatus, Model CMX-400 of JEOL, Ltd., and thus it was confirmed that a substance represented by MO—RSiO$_{3/2}$ or MO—R$_2$SiO (wherein R represents an organic functional group, and M represents a divalent metal) was present. The transparent material had a random network structure. Under consideration of these, the transparent material thus obtained is a substance having an organic-inorganic hybrid glass structure, i.e., an organic-inorganic hybrid glassy material.

In order to evaluate the airtightness capability of the organic-inorganic hybrid glassy material, methylene blue as an organic colorant was added to the organic-inorganic hybrid glassy material thus obtained, and exudation condition thereof after 1 month was observed. As a result, no exudation was observed, and it was found that the airtightness capability was satisfied. The glass transition point of the organic-inorganic hybrid glassy material after allowing it to stand in an atmosphere of 100° C. for 300 hours was measured. No change in glass transition point was found, and thus it was confirmed that no problem arose in heat resistance. The glassy material thus obtained was then allowed to stand in the air for 1 month, but no particular change was found therein, and thus it was confirmed that the material was excellent in chemical durability.

EXAMPLE 2-12

After the chemical durability test carried out in Example 2-11 (standing in an atmosphere at 100° C. for 300 hours and in the air for 1 month), the glassy material was further subjected to an aging treatment. In the aging treatment, the first aging was carried out in an atmosphere of about 200° C. and about 0.05 Torr for 5 minutes, and the second aging was carried out in the air for 210° C. for 3 hours, followed by cooling to room temperature. As a result, the softening temperature was changed to 100° C. The glassy material was subjected to the exudation test and the chemical durability test in the same manner as in Example 2-11, and it was confirmed that no problem arose therein.

EXAMPLE 2-13

A transparent material was obtained by using substantially the same raw materials and the same manner as in Example 2-11, provided that an isopropoxide of Ti was added to the raw material.

This material had a softening temperature of 103° C., and thus the effect of changes in properties owing to the addition of Ti (change in softening temperature and increase in refractive index) was confirmed. It was confirmed that SnO, RSiO$_{3/2}$ and R$_2$SiO were present by using a nuclear magnetic resonance apparatus, Model CMX-400 of JEOL, Ltd., and thus it was confirmed that a substance represented by MO—RSiO$_{3/2}$ or MO—R$_2$SiO (wherein R represents an organic functional group, and M represents a divalent metal) was present. The material had a random network structure. Under consideration of these, the transparent material thus obtained is a substance having an organic-inorganic hybrid glass structure, i.e., an organic-inorganic hybrid glassy material.

In order to evaluate the airtightness capability of the organic-inorganic hybrid glassy material, methylene blue as an organic colorant was added thereto, and exudation condition thereof after 1 month was observed. As a result, no exudation was observed, and it was found that the airtightness capability was satisfied. The glass transition point of the organic-inorganic hybrid glassy material after allowing it to stand in an atmosphere at 100° C. for 300 hours was measured. No change therein was found, and thus it was confirmed that no problem arose in heat resistance. The organic-inorganic hybrid glassy material thus obtained was then allowed to stand in the air for 1 month, but no particular change was found therein, and thus it was confirmed that the material was excellent in chemical durability.

EXAMPLE 2-14

After the chemical durability test carried out in Example 2-11 (standing in an atmosphere of 100° C. for 300 hours and in the air for 1 month), the glassy material was further subjected to an aging treatment. In the aging treatment, the first aging was carried out in an atmosphere of about 210° C. and about 0.05 Torr for 5 minutes, and the second aging was carried out in the air at 230° C. for 2 hours, followed by cooling to room temperature. As a result, the softening temperature was changed to 109° C. The glassy material was subjected to the exudation test and the chemical resistance test in the same manner as in Example 2-11, and it was confirmed that no problem arose therein.

EXAMPLE 2-15

A transparent material was obtained by using substantially the same raw materials and the same manner as in Example 2-11, provided that a chloride of Zn was added to the raw material.

The material had a softening temperature of 93° C., and thus a reduction in softening temperature owing to the addition of Zn was confirmed. It was confirmed that SnO, RSiO$_{3/2}$ and R$_2$SiO were present by using a nuclear magnetic resonance apparatus, Model CMX-400 of JEOL, Ltd., and thus it was confirmed that a substance represented by formula MO—RSiO$_{3/2}$ or MO—R$_2$SiO (wherein R represents an organic functional group, and M represents a divalent metal) was present. The material had a random network structure. Under consideration of these, the transparent material thus obtained was a substance having an organic-inorganic hybrid glass structure, i.e., an organic-inorganic hybrid glassy material.

In order to evaluate the airtightness capability of the organic-inorganic hybrid glassy material, methylene blue as an organic colorant was added thereto, and exudation condition thereof after 1 month was observed. As a result, no exudation was observed, and it was found that the airtightness capability was satisfied. The glass transition point of the organic-inorganic hybrid glassy material after allowing it to stand in an atmosphere at 100° C. for 300 hours was measured. No change therein was found, and thus it was confirmed that no problem arose in heat resistance. The organic-inorganic hybrid glassy material thus obtained was then allowed to stand in the air for 1 month, but no particular change was found therein, and thus it was confirmed that the material was excellent in chemical durability.

EXAMPLE 2-16

After the chemical durability test carried out in Example 2-11 (standing in an atmosphere at 100° C. for 300 hours and in the air for 1 month), the glassy material was further subjected to an aging treatment. In the aging treatment, the first aging was carried out in an atmosphere of about 200° C. and about 0.05 Torr for 5 minutes, and the second aging was carried out in the air at 220° C. for 2 hours, followed by cooling to room temperature. As a result, the softening temperature was changed to 99° C. The glassy material was subjected to the exudation test and the chemical resistance test in the same manner as in Example 2-11, and it was confirmed that no problem arose therein.

EXAMPLE 2-17

A transparent material was obtained by using substantially the same raw materials and the same manner as in Example 2-11, provided that rhodamine 6G as an organic colorant was added to the raw material.

This material had a softening temperature of 96° C., and was substantially uniformly colored. It was confirmed that SnO, $RSiO_{3/2}$ and $R_2SiO$ were present by using a nuclear magnetic resonance apparatus, Model CMX-400 of JEOL, Ltd., and thus it was confirmed that a substance represented by MO—$RSiO_{3/2}$ or MO—$R_2SiO$ (wherein R represents an organic functional group, and M represents a divalent metal) was present. The material had a random network structure. Under consideration of these, the transparent material thus obtained is a substance having an organic-inorganic hybrid glass structure, i.e., an organic-inorganic hybrid glassy material.

In order to evaluate the airtightness capability of the organic-inorganic hybrid glassy material, methylene blue as another organic colorant that was different from rhodamine 6G was added thereto, and exudation condition thereof after 1 month was observed. As a result, no exudation was observed, and it was found that the airtightness capability was satisfied. The glass transition point of the organic-inorganic hybrid glassy material after allowing it to stand in an atmosphere of 100° C. for 300 hours was measured. No change therein was found, and thus it was confirmed that no problem arose in heat resistance. The organic-inorganic hybrid glassy material thus obtained was then allowed to stand in the air for 1 month, but no particular change was found therein, and thus it was confirmed that the material was excellent in chemical durability.

EXAMPLE 2-18

After the chemical durability test carried out in Example 2-11 (standing in an atmosphere at 100° C. for 300 hours and in the air for 1 month), the glassy material was further subjected to an aging treatment. In the aging treatment, the first aging was carried out in an atmosphere of about 190° C. and about 0.05 Torr for 5 minutes, and the second aging was carried out in the air at 220° C. for 3 hours, followed by cooling to room temperature. As a result, the softening temperature was changed to 106° C. This glassy material was subjected to the exudation test and the chemical resistance test in the same manner as in Example 2-11, and it was confirmed that no problem arose therein.

EXAMPLE 2-19

A transparent material was obtained by using substantially the same raw materials and the same manner as in Example 2-11, provided that Er was added in the form of a chloride to the raw material to effect fluorescence.

This material had a softening temperature of 98° C., and upon observation in dark, it was possible to confirm that the material overall emitted a clear green-color fluorescent light upon exciting with a light having a wavelength of 380 nm. It was confirmed that SnO, $RSiO_{3/2}$ and $R_2SiO$ were present by using a nuclear magnetic resonance apparatus, Model CMX-400 of JEOL, Ltd., and thus it was confirmed that a substance represented by MO—$RSiO_{3/2}$ or MO—$R_2SiO$ (wherein R represents an organic functional group, and M represents a divalent metal) was present. The material had a random network structure. Under consideration of these, the transparent material thus obtained is a substance having an organic-inorganic hybrid glass structure, i.e., an organic-inorganic hybrid glassy material.

In order to evaluate the airtightness capability of the organic-inorganic hybrid glassy material, methylene blue as an organic colorant was added thereto, and exudation condition thereof after 1 month was observed. As a result, no exudation was observed, and it was found that the airtightness capability was satisfied. The glass transition point of the organic-inorganic hybrid glassy material after allowing it to stand in an atmosphere of 100° C. for 300 hours was measured. No change therein was found, and thus it was confirmed that no problem arose in heat resistance. The organic-inorganic hybrid glassy material thus obtained was then allowed to stand in the air for 1 month, but no particular change was found therein, and thus it was confirmed that the material was excellent in chemical durability.

EXAMPLE 2-20

After the chemical durability test carried out in Example 2-11 (standing in an atmosphere at 100° C. for 300 hours and in the air for 1 month), the glassy material was further subjected to an aging treatment. In the aging treatment, the first aging was carried out in an atmosphere of about 200° C. and about 0.05 Torr for 5 minutes, and the second aging was carried out in the air at 230° C. for 3 hours, followed by cooling to room temperature. As a result, the softening temperature was changed to 107° C. This glassy material was subjected to the exudation test and the chemical resistance test in the same manner as in Example 2-11, and it was confirmed that no problem arose therein.

COMPARATIVE EXAMPLE 2-1

Using substantially the same raw materials as in Example 2-1, water, ethanol and hydrochloric acid as a catalyst were added to phenyltriethoxysilane and ethyltriethoxysilane in a vessel, followed by stirring at room temperature for 2 hours to cause gelation. Thereafter, it was dried at about 100° C., and then the gel body was sintered at 700° C.

As a result, the substance thus obtained was not softened even at 800° C. and could not be recognized as a low melting point material. The presence of a substance represented by $R_nSiO_{(4-n)/2}$ (wherein R represents an organic functional group, and n represents a number of from 1 to 3) was not confirmed. The aging carried out in Examples 1 and 2 was tried, but no change was found, and thus it was decided that the aging could not be effected.

COMPARATIVE EXAMPLE 2-2

Using substantially the same raw materials as in Example 2-5, water, ethanol and hydrochloric acid as a catalyst were added to phenyltriethoxysilane and ethyltriethoxysilane in a vessel, followed by stirring at room temperature for 2 hours to cause gelation. Thereafter, it was dried at about 100° C., followed by sintering at 600° C.

As a result, the substance thus obtained was not softened even at 800° C. and could not be recognized as a low melting point material. It turned black to cause dirty appearance rather than the coloration in Example 2. The presence of the substance represented by $R_nSiO_{(4-n)/2}$ (wherein R represents an organic functional group, and n represents a number of from 1 to 3) was not confirmed.

COMPARATIVE EXAMPLE 2-3

Using substantially the same raw materials as in Example 2-7, water, ethanol and hydrochloric acid as a catalyst were added to phenyltriethoxysilane and ethyltriethoxysilane in a vessel, followed by stirring at room temperature for 2 hours to cause gelation. Thereafter, it was dried at about 100° C., followed by sintering at 650° C.

As a result, the substance thus obtained was not softened at 800° C. and could not be recognized as a low melting point material. It was also confirmed that the substance did not emit fluorescent light. The presence of the substance represented by $R_nSiO_{(4-n)/2}$ (wherein R represents an organic functional group, and n represents a number of from 1 to 3) was not confirmed.

COMPARATIVE EXAMPLE 2-4

Ethyltriethoxysilane ($EtSi(OEt)_3$) as a metal alkoxide was used as a starting material. Water, ethanol and hydrochloric acid as a catalyst were added to the ethyltriethoxysilane in a vessel, followed by stirring at room temperature for 2 hours to cause gelation. Thereafter, it was dried at about 100° C., and then it was tried to melt the gel body at 110° C. for 10 hours, but it was not melted. Methylene blue as an organic colorant was added in the stage of wet gel, followed by drying at about 100° C. to form a dry gel. The airtightness test was carried out. One week after that, exudation from the gel body was confirmed.

COMPARATIVE EXAMPLE 2-5

A mixed system of ethyltriethoxysilane ($EtSi(OEt)_3$) and methyltriethoxysilane ($MeSi(OEt)_3$) as a metal alkoxide was used as a starting material, and the molar ratio thereof was 8/2. Water, ethanol and hydrochloric acid as a catalyst were added to the ethyltriethoxysilane and the methyltriethoxysilane in a vessel, followed by stirring at room temperature for 2 hours to cause gelation. Thereafter, it was dried at about 100° C., and it was tried to melt the gel body at 110° C. for 10 hours, but it was not melted.

COMPARATIVE EXAMPLE 2-6

Using substantially the same raw materials as in Example 2-11, water, ethanol, hydrochloric acid as a catalyst and tin chloride were added to phenyltriethoxysilane and ethyltriethoxysilane in a vessel, followed by stirring at room temperature for 2 hours to cause gelation. Thereafter, it was dried at about 100° C., and then the gel body was sintered at 600° C.

As a result, the substance thus obtained was not softened even at 800° C. and could not be recognized as a low melting point material. While the presence of SnO was confirmed, the presence of a substance represented by $RSiO_{3/2}$ and $R_2SiO$ (wherein R represents an organic functional group) was not confirmed. The aging carried out in Examples 2-11 and 2-12 was tried, but no change was found, and thus it was decided that the aging could not be effected.

COMPARATIVE EXAMPLE 2-7

Using substantially the same raw materials as in Example 2-15, water, ethanol, hydrochloric acid as a catalyst and tin chloride were added to phenyltriethoxysilane and ethyltriethoxysilane in a vessel, followed by stirring at room temperature for 2 hours to cause gelation. Thereafter, it was dried at about 100° C., followed by sintering at 500° C.

As a result, the substance thus obtained was not softened even at 800° C. and could not be recognized as a low melting point material. It turned black to cause a dirty appearance rather than the coloration in Example 2-2. While the presence of SnO was confirmed, the presence of the substance represented by $RSiO_{3/2}$ and $R_2SiO$ (wherein R represents an organic functional group) was not confirmed.

COMPARATIVE EXAMPLE 2-8

Using substantially the same raw materials as in Example 2-17, water, ethanol, hydrochloric acid as a catalyst and tin chloride were added to phenyltriethoxysilane and ethyltriethoxysilane in a vessel, followed by stirring at room temperature for 2 hours to cause gelation. Thereafter, it was dried at about 100° C., followed by sintering at 550° C.

As a result, the substance thus obtained was not softened even at 800° C. and could not be recognized as a low melting point material. It was also confirmed that the substance did not emit fluorescent light. While the presence of SnO was confirmed, the presence of the substance represented by $RSiO_{3/2}$ and $R_2SiO$ (wherein R represents an organic functional group) was not confirmed.

COMPARATIVE EXAMPLE 2-9

Ethyltriethoxysilane ($EtSi(OEt)_3$) as a metal alkoxide was used as a starting material. Water, ethanol, hydrochloric acid as a catalyst and tin chloride were added to the ethyltriethoxysilane in a vessel and stirred at room temperature for 2 hours to cause gelation. Thereafter, it was dried at about 100° C., and it was tried to melt the gel body at 110° C. for 10 hours, but it was not melted. Methylene blue as an organic colorant was added in the stage of wet gel, followed by drying at about 100° C. to form dry gel. The airtightness test was carried out, but one week after that, exudation from the gel body was confirmed.

COMPARATIVE EXAMPLE 2-10

A mixed system of ethyltriethoxysilane (EtSi(OEt)$_3$) and diethoxydimethylsilane (Me$_2$Si(OEt)$_2$) as a metal alkoxide was used as a starting material, and the molar ratio thereof was 8/2. Water, ethanol, hydrochloric acid as a catalyst and tin chloride were added to the ethyltriethoxysilane and the diethoxydimethylsilane in a vessel, followed by stirring at room temperature for 2 hours to cause gelation. Thereafter, it was dried at about 100° C., and it was tried to melt the gel body at 110° C. for 10 hours, but it was not melted.

EXAMPLE 3-1

Phenyltriethoxysilane (PhSi(OEt)$_3$) as a metal alkoxide and ethanol were used as starting materials. Water, ethanol, hydrochloric acid as a catalyst and orthophosphoric acid were added to the phenyltriethoxysilane in a vessel, followed by stirring at room temperature for 2 hours to cause gelation. Thereafter, it was dried at about 100° C., and then the gel body was melted at 135° C. for 1 hour, followed by aging at 200° C. for 5 hours, to obtain a transparent material.

The softening behavior starting point was determined from the change in contraction amount in the TMA measurement with a temperature increasing rate of 10° C. per minute, and its starting temperature was designated as a softening temperature. The softening temperature of this material was 270° C. This material was re-heated, but a phenomena of crystallization was not found. It was confirmed that a silicon unit R$_n$SiO$_{(4-n)/2}$ (wherein R represents an organic functional group, and n represents a number of from 1 to 3) was present by using a nuclear magnetic resonance apparatus, Model CMX-400 of JEOL, Ltd. The transparent material had a random network structure. Under consideration of these, the transparent material thus obtained is a substance having an organic-inorganic hybrid glass structure, i.e., an organic-inorganic hybrid glassy material.

In order to evaluate the airtightness capability of this glassy material, an organic colorant was added to the organic-inorganic hybrid glassy material thus obtained, and exudation condition thereof after 1 month was observed. As a result, no exudation was observed, and it was found that the airtightness capability was satisfied. The glass transition point of the organic-inorganic hybrid glassy material after allowing it to stand in an atmosphere of 100° C. for 300 hours was measured. No change in glass transition point was found, and thus it was confirmed that no problem arose in heat resistance. The organic-inorganic hybrid glassy material thus obtained was then allowed to stand in the air for 1 month, but no particular change was found therein, and thus it was confirmed that the material was excellent in chemical durability.

EXAMPLE 3-2

Phenyltriethoxysilane (PhSi(OEt)$_3$) as a metal alkoxide and ethanol were used as starting materials. Water, ethanol, hydrochloric acid as a catalyst, tin chloride and phosphorous acid were added to the phenyltriethoxysilane in a vessel, followed by stirring at room temperature for 2 hours to cause gelation. Thereafter, it was dried at about 100° C., and then the gel body was melted at 135° C. for 1 hour, followed by aging at 200° C. for 5 hours, to obtain a transparent material.

The softening temperature of this material was 250° C. This glassy material was heated again, but a phenomena of crystallization was not found. It was confirmed that a silicon unit R$_n$SiO$_{(4-n)/2}$ (wherein R represents an organic functional group, and n represents a number of from 1 to 3) was present by using a nuclear magnetic resonance apparatus, Model CMX-400 of JEOL, Ltd. The transparent material had a random network structure. Under consideration of these, the transparent material thus obtained is a substance having an organic-inorganic hybrid glass structure, i.e., an organic-inorganic hybrid glassy material.

In order to evaluate the airtightness capability of the organic-inorganic hybrid glassy material, an organic colorant was added to the glassy material thus obtained, and exudation condition thereof after 1 month was observed. As a result, no exudation was observed, and it was found that the airtightness capability was satisfied. The glass transition point of the organic-inorganic hybrid glassy material after allowing it to stand in an atmosphere of 100° C. for 300 hours was measured. No change in glass transition point was found, and thus it was confirmed that no problem arose in heat resistance. The organic-inorganic hybrid glassy material thus obtained was then allowed to stand in the air for 1 month, but no particular change was found therein, and thus it was confirmed that the material was excellent in chemical durability.

EXAMPLE 3-3

Orthophosphoric acid (H$_3$PO$_4$), dimethyldichlorosilane (Me$_2$SiCl$_2$), diethyldichlorosilane (Et$_2$SiCl$_2$) and tin chloride (SnCl$_2$) were used as starting materials. Orthophosphoric acid was heated to 40° C. in a reaction apparatus under nitrogen atmosphere to turn it into liquid, followed by addition of dialkyldichlorosilane and then heating and stirring for 3 hours. In this procedure, the temperature was gradually increased to 100° C. by heating. Tin chloride was added in this stage. This was also heated at 250° C. under nitrogen atmosphere for 1 hour to obtain a final product.

The softening temperature of this material was 220° C. This glassy material was heated again, but a phenomenon of crystallization was not found. It was confirmed that a silicon unit R$_n$SiO$_{(4-n)/2}$ (wherein R represents an organic functional group, and n represents a number of from 1 to 3) was present by using a nuclear magnetic resonance apparatus, Model CMX-400 of JEOL, Ltd. The transparent material had a random network structure. Under consideration of these, the transparent material thus obtained is a substance having an organic-inorganic hybrid glass structure, i.e., an organic-inorganic hybrid glassy material.

In order to evaluate the airtightness capability of the organic-inorganic hybrid glassy material, methylene blue as an organic colorant was added to the organic-inorganic hybrid glassy material thus obtained, and exudation condition thereof after 1 month was observed. As a result, no exudation was observed, and it was found that the airtightness capability was satisfied. The glass transition point of the organic-inorganic hybrid glassy material after allowing it to stand in an atmosphere of 100° C. for 300 hours was measured. No change in glass transition point was found, and thus it was confirmed that no problem arose in heat resistance. The organic-inorganic hybrid glassy material thus obtained was then allowed to stand in the air for 1 month, but no particular change was found therein, and thus it was confirmed that the material was excellent in chemical durability.

COMPARATIVE EXAMPLE 3-1

Using substantially the same raw materials as in Example 3-1, water, ethanol and hydrochloric acid as a catalyst were added to phenyltriethoxysilane and ethyltriethoxysilane in a vessel, followed by stirring at room temperature for 2 hours to cause gelation. Thereafter, it was dried at about 100° C., and then the gel body was sintered at 600° C.

As a result, the substance thus obtained was not softened even at 800° C. and could not be recognized as a low melting point material.

COMPARATIVE EXAMPLE 3-2

Using substantially the same raw materials as in Example 3-2, water, ethanol and hydrochloric acid as a catalyst were added to phenyltriethoxysilane and ethyltriethoxysilane in a vessel, followed by stirring at room temperature for 2 hours to cause gelation. Thereafter, it was dried at about 100° C., followed by sintering at 500° C.

As a result, the substance thus obtained was not softened even at 800° C. and could not be recognized as a low melting point material.

COMPARATIVE EXAMPLE 3-3

Using substantially the same raw materials as in Example 3-2, water, ethanol and hydrochloric acid as a catalyst were added to phenyltriethoxysilane and ethyltriethoxysilane in a vessel, followed by stirring at room temperature for 2 hours to cause gelation. Thereafter, it was dried at about 100° C., followed by sintering at 550° C.

As a result, the substance thus obtained was not softened even at 800° C. and could not be recognized as a low melting point material.

EXAMPLE 4-1

Phenyltriethoxysilane ($PhSi(OEt)_3$) as a metal alkoxide and ethanol were used as starting materials for the sol-gel method. Water, ethanol and hydrochloric acid as a catalyst were added to the phenyltriethoxysilane in a vessel, followed by stirring at room temperature for 2 hours to cause gelation. Thereafter, it was dried at about 100° C.

Orthophosphoric acid ($H_3PO_4$), dimethyldichlorosilane ($Me_2SiCl_2$), diethyldichlorosilane ($Et_2SiCl_2$) and tin chloride ($SnCl_2$) were used as starting materials for the non-aqueous acid-base reaction method. Orthophosphoric acid was heated to 40° C. in a reaction apparatus under nitrogen atmosphere to turn it into liquid, followed by addition of dialkyldichlorosilane and then heating and stirring for 3 hours. During this step, the temperature was gradually increased to 100° C. by heating. Tin chloride was added in this stage. This was also heated at 250° C. under nitrogen atmosphere for 1 hour to obtain a transparent material.

The gel body and the transparent material were mixed together, followed by melting at 150° C. for 1 hour and then aging at 200° C. for 5 hours, to obtain another transparent material.

The softening behavior starting point was determined from the change in contraction amount in the TMA measurement with a temperature increasing rate of 10° C. per minute, and the starting temperature was designated as a softening temperature. The softening temperature of this material was 60° C. It was confirmed that a silicon unit $R_nSiO_{(4-n)/2}$ (wherein R represents an organic functional group, and n represents a number of from 1 to 3) was present by using a nuclear magnetic resonance apparatus, Model CMX-400 of JEOL, Ltd. The transparent material had a random network structure. Under consideration of these, the transparent material thus obtained is a substance having an organic-inorganic hybrid glass structure, i.e., an organic-inorganic hybrid glassy material.

In order to evaluate the airtightness capability of the organic-inorganic hybrid glassy material, methylene blue as an organic colorant was added to the organic-inorganic hybrid glassy material thus obtained, and exudation condition thereof after 1 month was observed. As a result, no exudation was observed, and it was found that the airtightness capability was satisfied. The glass transition point of the organic-inorganic hybrid glassy material after allowing it to stand in an atmosphere of 100° C. for 300 hours was measured. No change in glass transition point was found, and thus it was confirmed that no problem arose in heat resistance. The organic-inorganic hybrid glassy material thus obtained was then allowed to stand in the air for 1 month, but no particular change was found therein, and thus it was confirmed that the material was excellent in chemical durability.

EXAMPLE 4-2

Ethyltriethoxysilane ($EtSi(OEt)_3$) as a metal alkoxide and ethanol were used as starting materials for the sol-gel method. Water, ethanol and hydrochloric acid as a catalyst were added to the ethyltriethoxysilane in a vessel, followed by stirring at room temperature for 2 hours to cause gelation. Phosphorous acid ($H_3PO_3$), dimethyldichlorosilane ($Me_2SiCl_2$), diethyldichlorosilane ($Et_2SiCl_2$) and tin chloride ($SnCl_2$) were used as starting materials for the non-aqueous acid-base reaction method. Phosphorous acid was heated to 40° C. in a reaction vessel under nitrogen atmosphere to turn it into a liquid, followed by addition of dialkyldichlorosilane and then heating and stirring for 3 hours. In this procedure, the temperature was gradually increased to 100° C. by heating. Tin chloride was added in this stage. It was further heated at 250° C. under nitrogen atmosphere for 1 hour to obtain a transparent material.

The gel body and the transparent material were mixed together, followed by melting at 150° C. for 1 hour and then aging at 200° C. for 5 hours, to obtain a new transparent material.

The softening behavior starting point was determined from the change in contraction amount in the TMA measurement with a temperature increasing rate of 10° C. per minute, and the starting temperature was designated as a softening temperature. The softening temperature of this material was 120° C. It was confirmed that a silicon unit $R_nSiO_{(4-n)/2}$ (wherein R represents an organic functional group, and n represents a number of from 1 to 3) was present by using a nuclear magnetic resonance apparatus, Model CMX-400 of JEOL, Ltd. The transparent material had a random network structure. Under consideration of these, the transparent material thus obtained is a substance having an organic-inorganic hybrid glass structure, i.e., an organic-inorganic hybrid glassy material.

In order to evaluate the airtightness capability of the organic-inorganic hybrid glassy material, an organic colorant was added to the organic-inorganic hybrid glassy material thus obtained, and exudation condition thereof after 1 month was observed. As a result, no exudation was observed, and it was found that the airtightness capability was satisfied. The glass transition point of the organic-inorganic hybrid glassy material after allowing it to stand in an atmosphere at 100° C. for 300 hours was measured. No change in glass transition point was found, and thus it was confirmed that no problem arose in heat resistance. The organic-inorganic hybrid glassy material thus obtained was then allowed to stand in the air for 1 month, but no particular change was found therein, and thus it was confirmed that the material was excellent in chemical durability.

COMPARATIVE EXAMPLE 4-1

Using substantially the same raw materials as in Example 4-1, the gel body and the glassy material thus obtained by the respective methods were mixed and then sintered at 600° C. As a result, the substance thus obtained was not softened even at 800° C. and could not be recognized as a low melting point material.

COMPARATIVE EXAMPLE 4-2

Using substantially the same raw materials as in Example 4-2, the gel body and the glassy material thus obtained by the respective methods were mixed and then sintered at 700° C. As a result, the substance thus obtained was not softened even at 800° C. and could not be recognized as a low melting point material.

What is claimed is:

1. A process for producing an organic-inorganic hybrid glassy material, the process comprising the sequential steps of:
producing a gel body by a sol-gel method in which at least one kind of a silicon alkoxide containing a phenyl group is used as a sol-gel raw material, and in which only an acid is used as a catalyst of the sol-gel method;
drying the gel body to obtain a dry gel;
melting the dry gel by heating at a temperature of from 100° C. to 300° C. into a melt; and
aging the melt at a temperature of from 30° C. to 400° C. for a period of time of 5 minutes or longer,
wherein a structure of the gel body contains a unit represented by the formula $Ph_n SiO_{(4-n)/2}$, where Ph represents a phenyl group and n represents a natural number selected from 1, 2 and 3.

2. A process according to claim 1, wherein the acid is hydrochloric acid or acetic acid.

3. A process for producing an organic-inorganic hybrid glassy material, the process comprising the sequential steps of:
producing a gel body by a sol-gel method in which at least one kind of a silicon alkoxide containing a phenyl group is used as a sol-gel raw material, and in which only an acid is used as a catalyst of the sol-gel method;
drying the gel body to obtain a dry gel;
mixing the dry gel with a substance obtained by a non-aqueous acid-base reaction method to prepare a mixture;
melting the mixture by heating at a temperature of from 100° C. to 300° C. into a melt; and
aging the melt at a temperature of from 30° C. to 400° C. for a period of time of 5 minutes or longer.

4. A process for producing an organic-inorganic hybrid glassy material as claimed in claim 3, wherein the gel body produced by the sol-gel method contains $RSiO_{3/2}$ or $R_2SiO$, wherein R represents a phenyl group.

5. A process for producing an organic-inorganic hybrid glassy material as claimed in claim 3 or 4, wherein the substance obtained by the non-aqueous acid-base reaction method contains $R_2SiO$, wherein R represents a methyl or ethyl group, $P_2O_5$ and SnO.

6. A process according to claim 3, wherein the acid is hydrochloric acid.

7. A process for producing an organic-inorganic hybrid glassy material, the process comprising the sequential steps of:
producing a gel body by a sol-gel method in which a phenyltrialkoxysilane and a second silane are used as sol-gel raw materials, wherein the second silane is selected from the group consisting of alkylalkoxysilanes and diphenyldialkoxysilanes;
drying the gel body to obtain a dry gel;
melting the dry gel by heating at a temperature of from 100° C. to 300° C. into a melt; and
aging the melt at a temperature of from 30° C. to 400° C. for a period of time of 5 minutes or longer,
wherein a ratio of the phenyltrialkoxysilane to the second silane by mol percent based on a total mol number of the phenyltrialkoxysilane and the second silane is from 7:3 to 9:1.

8. A process according to claim 7, wherein:
the phenyltrialkoxysilane is phenyltriethoxysilane; and
the diphenyldialkoxysilane is diphenyldiethoxysilane or the alkylalkoxysilane is selected from the group consisting of methyltriethoxysilane, dimethyldiethoxysilane, diethyldiethoxysilane, and ethyltriethoxysilane.

9. A process according to claim 7, wherein:
the phenyltrialkoxysilane is phenyltriethoxysilane; and
the second silane is a dialkyldialkoxysilane.

10. A process according to claim 9, wherein the dialkyldialkoxysilane is dimethyldiethoxysilane or diethyldiethoxysilane.

11. A process according to claim 7, wherein:
the phenyltrialkoxysilane is phenyltriethoxysilane; and
the second silane is a diphenyldialkoxysilane.

12. A process according to claim 11, wherein the diphenyldialkoxysilane is diphenyldiethoxysilane.

* * * * *